Patented June 6, 1933

1,912,718

UNITED STATES PATENT OFFICE

THOMAS F. MURRAY, JR., AND CYRIL J. STAUD, OF ROCHESTER, NEW YORK

CELLULOSE ACETATE COMPOSITIONS CONTAINING DIBENZYL ANILINE

No Drawing.    Application filed June 9, 1932.   Serial No. 616,366.

This invention relates to the manufacture of cellulose organic ester sheets. One object of our invention is to provide cellulose ester sheets having a crystalline or nacreous appearance, such as are useful in the manufacture of toilet articles, novelties, etc. Another object of our invention is to provide semi-opaque or translucent cellulose ester sheets, which are useful for making tracings, as a base for photographic positives, etc. Other objects will hereinafter appear.

In order to produce crystalline effects in cellulose ester sheets, a substance is introduced into the cellulose ester solution from which the sheets are to be cast, which substance is of low solubility in the cellulose ester solvent used in making the solution. As the solvent evaporates, the substance crystallizes out in the sheet. The crystal form is characteristic of the substance used as crystallizing agent. In order to give a beautiful effect, the crystal form should be well defined, and the crystals should impart a soft sheen to the cellulose ester sheet. While flexibility such as is required in motion picture film is not necessary in these decorative sheets, the crystallizing agent should not be a substance which causes actual brittleness of the sheet.

We have discovered that dibenzyl aniline is a satisfactory crystallizing agent for use in cellulose acetate and other organic ester sheets, and that it imparts a beautiful appearance to such sheets. Furthermore, we have discovered that when an amount of dibenzyl aniline is used which is too small to impart a crystalline appearance to the sheet, but too great to be entirely compatible with the cellulose acetate, a sheet of smooth, uniform semi-opacity or translucency is produced. Dibenzyl aniline has been described in the literature, and has the structural formula

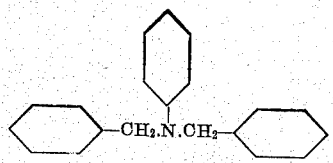

In order that those skilled in this art may better understand our invention, we would state, by way of illustration, that for the manufacture of translucent sheets, our new compositions of matter may be compounded as follows: 100 parts of acetone-soluble cellulose acetate, i. e. cellulose acetate containing from 36% to 42% acetyl radical, approximately, is dissolved with stirring at atmospheric temperature in 300 to 500 parts, preferably 400 parts, by weight, of acetone. To this solution is added from about 30 to 40 parts by weight of dibenzyl aniline. If it is desired to make a film with a crystalline appearance, approximately 50 parts by weight of dibenzyl aniline is added to the cellulose acetate solution. If the amount of dibenzyl aniline is decreased to 20 parts, a clear skin results. The amount of solvent employed may be increased or decreased, depending upon whether it is desired to have a more or less freely flowing composition, respectively. Compositions of matter prepared as described may be deposited upon any suitable film-forming surface to form films or sheets, in a manner well known to those skilled in the art.

Other solvents (instead of acetone) which are compatible with the cellulose acetate and in which dibenzyl aniline has only a limited solubility may also occur to those skilled in this art. In like manner dibenzyl aniline may be compounded with other single organic esters of cellulose, such as cellulose propionate, butyrate and the like, or with mixed organic esters, such as cellulose acetostearate, cellulose aceto-propionate, or cellulose aceto-malate, a suitable solvent which will dissolve the cellulose ester and in which the dibenzy aniline shows only a limited solubility being employed.

We have found that the use of dibenzyl aniline in sheets is useful in preventing the passage of ultra-violet rays into the material, and thus helps to prevent decomposition of the cellulose ester in the sheet, with consequent deterioration of the sheet. This is true even though the concentration of dibenzyl aniline in the composition is so low that the compound does not crystallize during the evaporation of the solvent but remains dispersed in the cellulose derivative sheet and transparency rather than nacreous translucency results.

What we claim as our invention and desire to be secured by Letters Patent of the United States is:

1. A composition of matter comprising a cellulose organic ester and dibenzyl aniline.

2. A composition of matter comprising cellulose acetate and dibenzyl aniline.

3. A cellulose organic ester sheet comprising crystallized dibenzyl aniline.

4. A cellulose acetate sheet comprising crystallized dibenzyl aniline.

5. A relatively thin, translucent sheet comprising a cellulose organic ester and dibenzyl aniline.

6. A relatively thin, translucent sheet comprising cellulose acetate and dibenzyl aniline.

7. A cellulose acetate sheet comprising 100 parts by weight of cellulose acetate and approximately 50 parts by weight of dibenzyl aniline.

8. A cellulose acetate sheet comprising 100 parts by weight of cellulose acetate and approximately 30 to 40 parts by weight of dibenzyl aniline.

9. A composition of matter comprising a cellulose organic ester and dibenzyl aniline as an opaquing agent.

10. A composition of matter comprising cellulose acetate and dibenzyl aniline as an opaquing agent.

Signed at Rochester, New York this 1st day of June 1932.

THOMAS F. MURRAY, JR.
CYRIL J. STAUD.